Oct. 23, 1923.

P. J. F. GALLAGHER 1,471,953

FRUIT BASKET

Filed Oct. 16, 1922

WITNESSES

INVENTOR
P.J.F. Gallagher
BY
ATTORNEYS

Patented Oct. 23, 1923.

1,471,953

UNITED STATES PATENT OFFICE.

PATRICK J. F. GALLAGHER, OF MARLBORO, NEW YORK.

FRUIT BASKET.

Application filed October 16, 1922. Serial No. 594,826.

*To all whom it may concern:*

Be it known that I, PATRICK J. F. GALLAGHER, a citizen of the United States, and a resident of Marlboro, in the county of Ulster and State of New York, have invented a new and Improved Fruit Basket, of which the following is a full, clear, and exact description.

This invention relates to improvements in baskets and has particular reference to a fruit basket.

An object of the invention is to provide a simple, inexpensive and effective mounting for the handle and cover of a basket whereby the handle may be recessed within the basket so that a number of baskets may be nested for shipment and the cover securely maintained in closing position after the basket has been filled with fruit.

The above and other objects will appear more clearly from the following detail description, when taken in connection with the accompanying drawing, which illustrates a preferred embodiment of the inventive idea.

In the drawing—

Figure 1:
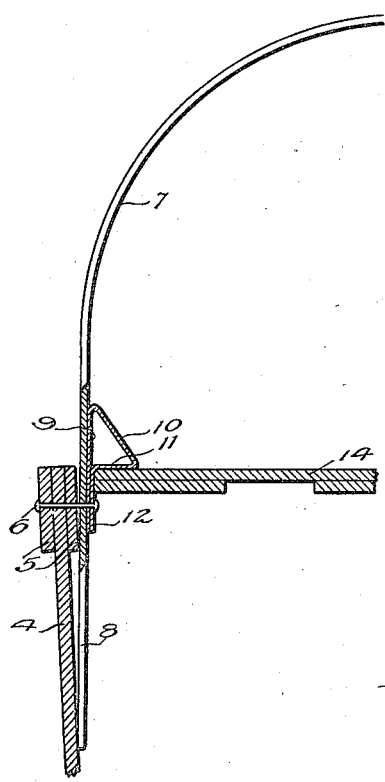
Figure 1 is a fragmentary transverse section through the basket showing the cover in position and the handle extended.
Figure 2:
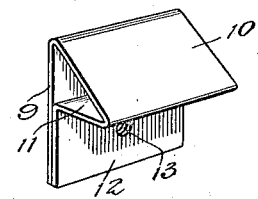
Figure 2 is a perspective view of the cover retaining means employed in connection with the invention.

Referring more particularly to the accompanying drawing, the numeral 4 indicates the body portion of the basket, which is preferably formed of veneer as distinguished from the ordinary fruit basket which is usually made of splints, the side walls of the basket being inclined inwardly toward the bottom thereof. The top edge of the basket is preferably provided with inner and outer reinforcing strips 5 and at the central portion of the basket the same is provided with oppositely disposed pivot pins 6 to which the handle 7 is connected adjacent the extremities thereof, the free ends 8 of said handle being adapted to frictionally engage the inner surfaces of the side walls of the basket when the handle is in its extended position. This frictional engagement between the ends of the handle 7 and the side walls of the basket aids in maintaining the handle in its extended position when in use. It will be obvious that by reason of the pivotal connection of the handle with the basket the former may be swung to substantially horizontal position and recessed within the basket so that a number of baskets may be nested for shipment.

Supported by each pivot pin 6 and positioned interiorly of the handle 7 is a cover retaining member 9, preferably formed of a single length of material which is bent upon itself to provide the inclined portion 10, the horizontal portion 11 and the portion 12, which forms one extremity of the retaining member and which engages the other extremity thereof, said extremities being provided with an opening 13 for receiving the pivot pin 6, the retaining member being thus secured to the handle and movable therewith.

Figure 3:
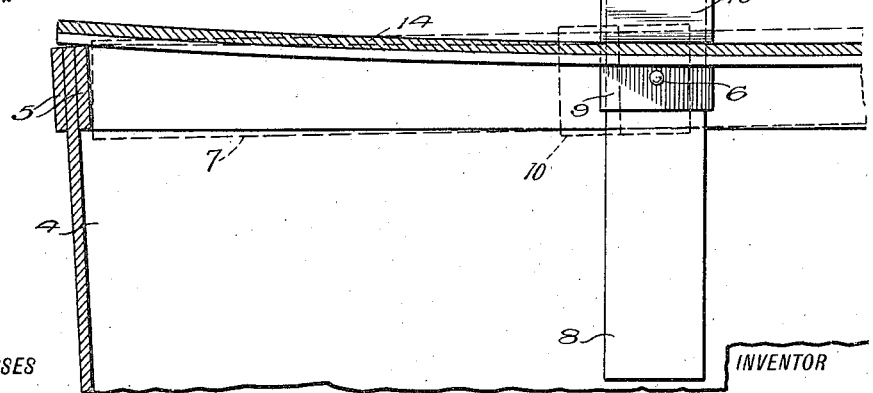
Figure 3 is a fragmentary longitudinal section through the basket.

After the basket has been filled and it is desired to mount the cover 14 thereof in closing position, one longitudinal edge of said cover is first positioned beneath the portion 11 of one of the retaining members 9. The other edge of said cover is then engaged with the inclined portion 10 of the other retaining member 9 and pressure is exerted upon said edge of the cover so as to force the adjacent side of the basket 4 outwardly to position the edge of the cover beneath the portion 11 of said other retaining member. At the same time a downward pressure may be exerted upon the intermediate portion of the handle 7 in order to flex the sides of the basket outwardly to facilitate the positioning of the cover beneath the retaining members. The under surfaces of the portions 11 of the retaining members are in substantially the same plane as the upper edge of the basket 4 and the cover 14 is of slightly greater length than the interior length of the basket so that when the cover is in closing position the ends thereof rest upon the upper edges of the basket, as shown in Figure 3, while the intermediate portion of the cover is flexed downwardly by reason of the engagement with the portions 11 of the retaining member, thus placing a tension upon the ends of the cover which make it extremely difficult to raise said ends and extract fruit from the basket. This construction has been found to be quite advantageous over the constructions employed in baskets now in use which simply employ clips to secure the cover to the basket, which clips are easily removable to enable fruit to be surreptitiously extracted from the basket.

What I claim is:

1. In a basket, a body portion having side walls, a handle pivoted to said side walls and having its ends arranged interiorly thereof and at an angle thereto whereby a frictional engagement between said ends and side walls is effected when the handle is in extended position.

2. In a basket, a body portion, a handle therefor, a cover for said body portion, and retaining means carried by said handle and having angular portions, one of which is engageable by the cover to spread the side walls of the body portion when placing the cover in closing position and the other of said angular portions being engageable with said cover to maintain the same in closing position.

3. In a bracket, a body portion, a handle therefor, a cover for said body portion, and retaining means carried by said handle and having angular portions, one of which is engageable by the cover to spread the side walls of the body portion when placing the cover in closing position and the other of said angular portions being engageable with said cover to maintain the same in closing position, the last named angular portion being in the same plane with the upper edge of the body portion.

4. In a basket, a body portion, a handle therefor, a cover for the basket engageable with the upper edge of said body portion at oppositely disposed points and capable of being flexed downwardly into the basket at intermediate points, and means carried by said handle and engageable with said cover to maintain the same in a flexed position.

5. In a basket, a body portion, a handle therefor, a cover for the basket engageable with the upper edge of said body portion at oppositely disposed points and capable of being flexed downwardly into the basket at intermediate points, and a retaining element formed of a single length of material bent upon itself to provide a cover engaging portion for maintaining said cover in a flexed position.

6. In a basket, a body portion, a handle therefor, a cover for the basket engageable with the upper edge of said body portion at oppositely disposed points and capable of being flexed downwardly into the basket at intermediate points, and a retaining element formed of a single length of material bent upon itself to provide a cover engaging portion for maintaining said cover in a flexed position, said cover engaging portion being disposed in the same horizontal plane with the upper edge of said body portion.

7. In a basket, a body portion, a handle therefor, a cover for said body portion, and a cover retaining member interposed between said handle and cover and provided with an inclined cover guiding portion and an angularly disposed cover engaging portion, the latter of which is adapted to engage the cover to maintain the same in any position on the body portion.

8. In a basket, a body portion the side walls of which are capable of being flexed outwardly, a cover for said body portion having its ends supported upon the upper edges of the ends of said body portion, and means engageable by said cover when the latter is being placed in closing position for flexing said side walls outwardly to permit of the intermediate portion of said cover being flexed downwardly into the basket so that the upper surface of the cover will be substantially in a plane with the upper edge of said side walls.

9. In a basket, a body portion the side walls of which are capable of being flexed outwardly, a cover for said body portion having its ends supported upon the upper edges of the ends of said body portion, and means engageable by said cover when the latter is being placed in closing position for flexing said side walls outwardly to permit of the intermediate portion of said cover being flexed downwardly into the basket so that the upper surface of the cover will be substantially in a plane with the upper edge of said side walls, said means also engaging said cover to retain the same in its flexed position.

PATRICK J. F. GALLAGHER.